(12) United States Patent
Duccini et al.

(10) Patent No.: US 6,395,813 B1
(45) Date of Patent: May 28, 2002

(54) AQUEOUS DISPERSIONS

(75) Inventors: Yves Duccini, Beauvais; Alain DuFour, Verneuil en Halatte, both of (FR)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/628,064

(22) Filed: Jul. 28, 2000

(51) Int. Cl.⁷ .................................................. C08K 3/26
(52) U.S. Cl. ........................................................ 524/425
(58) Field of Search ............................ 523/333; 524/425

(56) References Cited

U.S. PATENT DOCUMENTS

| | | | |
|---|---|---|---|
| 4,046,707 A | | 9/1977 | Smith et al. ................. 252/180 |
| 4,509,987 A | * | 4/1985 | Farrar ......................... 106/308 |
| 4,517,098 A | * | 5/1985 | Hann ........................... 210/701 |
| 4,554,307 A | * | 11/1985 | Farrar ......................... 524/425 |
| 4,588,649 A | | 5/1986 | Kriz ............................ 428/511 |
| 4,851,490 A | * | 7/1989 | Chen ........................... 526/278 |
| 4,868,228 A | | 9/1989 | Gonnet et al. ............... 523/333 |
| 5,077,361 A | | 12/1991 | Hughes et al. .............. 526/233 |
| 5,216,099 A | * | 6/1993 | Hughes .................... 526/318.2 |
| 5,294,686 A | | 3/1994 | Flarman et al. ............. 526/233 |
| 5,294,687 A | * | 3/1994 | Blankenship ............... 526/233 |
| 5,376,731 A | | 12/1994 | Kerr et al. ................... 525/340 |
| 5,708,095 A | * | 1/1998 | Page ............................ 525/301 |
| 5,866,664 A | * | 2/1999 | McCallum ................... 526/233 |
| 5,874,387 A | * | 2/1999 | Carpenter ................... 507/228 |

FOREIGN PATENT DOCUMENTS

| | | |
|---|---|---|
| EP | 0129329 B2 | 8/1989 |
| EP | 0 646 555 | 4/1995 |
| EP | 0 792 890 A1 | 9/1997 |
| EP | 0705892 A2 | 4/1998 |
| EP | 0569731 B1 | 12/1998 |
| WO | WO 94539 | 2/1991 |

* cited by examiner

Primary Examiner—Paul R. Michl

(57) ABSTRACT

The present invention relates to a dispersion of particulate solid in a medium containing water and at least one dispersing agent. In particular, the dispersing agent comprises a water soluble polymer

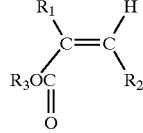

wherein X is H, Na, K, Ca, Mg, $NH_4^+$ or A; and A is a polymer, copolymer or water soluble salt thereof, comprising one or more of the following monomers in polymerised form:

$$\begin{array}{c} R_1 \\ \phantom{R_3OC}\diagdown \phantom{C}\diagup H \\ C=C \\ \phantom{R_3OC}\diagup \phantom{C}\diagdown R_2 \\ R_3OC \\ \| \\ O \end{array}$$

wherein $R_1$ is H, OH, $C_1$ to $C_9$ alkyl or alkoxy or acetoxy or acetate $R_2$ is H, $C_1$ to $C_3$ alkyl or alkxy, $COOR_3$ $R_3$ is H, Na, K, or $C_1$ to $C_{10}$ alkyl;

hydroxylpropyl acrylate, propyl methacrylate, 2-acrylamido-2-propane sulphonic acid, sodium styrene sulphonate, sodium allylsulphonate, sodium methyl sulphonate, vinyl sulphonic acid, and salts thereof; acrylamide, methacrylamide, tert-butylacrylamide, (meth)acrylonitrile, styrene, vinyl acetate allyloxy-2-hydroxypropyl sulphonate and dialkylacrylamide;

and further wherein A contains at least 10 monomers in polymerised form.

5 Claims, No Drawings

AQUEOUS DISPERSIONS

The present invention relates to dispersions or slurries of particulate solids in water; in particular to dispersions of mineral solids which normally tend to aggregate, settle or phase out, and to a method of inhibiting those phenomena in slurries containing such mineral particles so as to improve the viscosity of such slurries making them more workable.

The present invention is suitable to produce slurries of various particulate solids, for example calcium carbonate for the paper industry and clays for use in the ceramic industry, but in fact the invention may be used for producing a workable aqueous dispersion or slurry of any solid particles in high a concentration.

Previous attempts at producing such aqueous dispersions are described in, for example, EP-B-0129329. This document discloses pigment slurries containing water soluble polymers of molecular weight from 1,500 to 6,000 formed from one or more ethylenically unsaturated monomers and containing acid groups selected from carboxyl and sulphonic groups. The present invention shows enhanced performance over this prior art.

U.S. Pat. No. 4,868,228 discloses grinding agents in aqueous suspensions of mineral materials, and, in particular, the use of such grinding agents to produce low viscosity aqueous suspensions of mineral solids. The grinding agents are described to be acrylic acid polymers and/or copolymers that are completely neutralised by at least one neutralising agent having a monovalent function and at least one neutralising agent having a polyvalent function.

EP-A2-0705892 teaches dispersions or slurries of solid particles in water which also comprise a phosphonocarboxylic acid or a water soluble salt thereof of the following formula, as a dispersing:

wherein at least one R group in each unit is a $COOM_{1/v}$ group and the other R group is hydrogen or a $COOM_{1/v}$ hydroxyl, phosphono, sulphono, sulphato, $C_{1-7}$ alkyl group or a carboxylate, phosphono, sulphono, sulphato and/or hydroxy substituted $C_{1-7}$ alkyl or $C_{1-7}$ alkenyl group, and each M is a cation such that the phosphonated carboxylate is water soluble and n (the number of monomer units in polymerised form in the polymer chain) is from 1 to 6 and preferably less that 5, for example 1 to 3. The solid particles dispersed in this prior art preferably have a particle size of less than 1 mm, for example less than 0.5 mm, preferably 0.5 to 100 μm especially 1 to 50 μm.

The present invention seeks to provide improved dispersions or slurries of solid particles in water. It is well known, for example see PCT/US 91/94539, that it is especially difficult to achieve stable dispersions of fine materials; thus, it is of particular interest to produce stable dispersions of fine solid particles, such as those which have a significant proportion with a particle size of less than 2 μm.

The present invention, therefore, provides a dispersion of particulate solid in a medium containing water and at least one dispersing agent, characterised in that said dispersing agent comprises a water soluble polymer comprising:

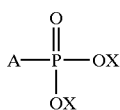

wherein X is H, Na, K, Ca, Mg, $NH_4^+$ or A; and A is a polymer, copolymer or water soluble salt thereof, comprising one or more of the following monomers in polymerised form:

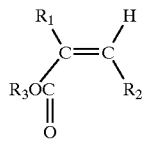

wherein $R_1$ is H, OH, $C_1$ to $C_9$ alkyl or alkoxy or acetoxy or acetate $R_2$ is H, $C_1$ to $C_3$ alkyl or alkxy, $COOR_3$ $R_3$ is H, Na, K, or $C_1$ to $C_{10}$ alkyl;

hydroxylpropyl acrylate, propyl methacrylate, 2-acrylamido-2-propane sulphonic acid, sodium styrene sulphonate, sodium allylsulphonate, sodium methyl sulphonate, vinyl sulphonic acid, and salts thereof; acrylamide, methacrylamide, tert-butylacrylamide, (meth) acrylonitrile, styrene, vinyl acetate allyloxy-2-hydroxypropyl sulphonate and dialkylacrylamide; and further wherein A contains at least 10 monomers in polymerised form.

The number of monomers in polymerised form can be from 10 to more than 100, but preferably it is from 15 to 85 and most preferably from 25 to 60. The dispersing agents may have a weight average molecular weight of from 1000 to 10,000, and dispersing agents having a weight average molecular weight of from 2000 to 6000 are especially preferred. Although stable dispersions with a low viscosity can be obtained with dispersing agents of a higher molecular weight, there is an increased tendency for gel formation with polymers of molecular weight above 6000 which may be disadvantageous in some applications.

The invention is particularly suited to forming dispersions of very fine particles, for example, those in which 70% or more of the particles are below 2 μm, and preferably those in which 70% or more are below 1 μm. The invention works particularly well with dispersions of fine particles in which 95% or more of the particles are below 1 μm.

The water soluble dispersing agent is preferably a phosphono terminated homo- or co-polymer of acrylic acid. The other monomer if the dispersing agent is a copolymer may be maleic acid or maleic anhydride, methacrylic acid, sulfonic unsaturated monomers or any unsaturated polymerisable monomers having a COOH group. Such polymers may be made, for example, according to U.S. Pat. No. 4,046,707, U.S. Pat. No. 5,376,731, U.S. Pat. No. 5,077,361 and U.S. Pat. No. 5,294,686.

The dispersed or suspended solid may be any particulate solid which is sufficiently chemically inert to be dispersed or suspended in an aqueous medium. The particles are preferably inorganic, and substantially insoluble in water. Examples include calcium carbonate, clays, kaolin, talc and metallic oxides.

The liquid medium may be water, or a water-containing solution. This medium may also contain alcohols, glycols, surfactants or wetting agents.

The composition of the present invention provides at least two important advantages, namely, a reduction in viscosity of the dispersion and a reduction in the tendency of the dispersion to form a gel particularly in fine particle dispersions. In addition, these benefits are obtained for systems in which the percentage by weight of the solid particles in the dispersion is high, for example greater than 60% and preferably greater than 75%.

Finally, the invention also provides a method of reducing the viscosity of a dispersion of solid particulate material in an aqueous medium, comprising contacting the aqueous medium, either before or after forming the dispersion of the solid particulate material, with an effective amount of at least one dispersing agent, wherein said dispersing agent comprises a water soluble polymer comprising:

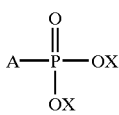

wherein X is H, Na, K, Ca, Mg, $NH_4^+$ or A; and A is a polymer, copolymer or water soluble salt thereof, comprising one or more of the following monomers in polymerised form:

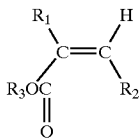

wherein $R_1$ is H, OH, $C_1$ to $C_9$ alkyl or alkoxy or acetoxy or acetate $R_2$ is H, $C_1$ to $C_3$ alkyl or alkxy, $COOR_3$ $R_3$ is H, Na, K, or $C_1$ to $C_{10}$ alkyl;

hydroxylpropyl acrylate, propyl methacrylate, 2-acrylamido-2-propane sulphonic acid, sodium styrene sulphonate, sodium allylsulphonate, sodium methyl sulphonate, vinyl sulphonic acid, and salts thereof; acrylamide, methacrylamide, tert-butylacrylamide, (meth) acrylonitrile, styrene, vinyl acetate allyloxy-2-hydroxypropyl sulphonate and dialkylacrylamide; and further wherein A contains at least 10 monomers in polymerised form.

There are three general methods for making a dispersion of calcium carbonate fines:

1) combine natural calcium carbonate (including marble dust), water and dispersing agent together and mix to form a slurry;
2) precipitate calcium carbonate from an aqueous solution of soda lime (calcium hydroxide) and carbon dioxide, collect the precipitated material and mix with water and a dispersing agent to form a slurry; and
3) grind calcium carbonate to the desired particle size and mix with water and a dispersing agent to form a slurry.

The invention will now be described with reference to the following Examples.

General Method (A) to Prepare Dispersions of Either Coarse or Finely Precipitated Calcium Carbonate and Measurement of Viscosity Thereof a) An aqueous solution is formed by dissolving a dispersing agent in water in a beaker.

b) The aqueous solution is then agitated and a mineral solid to be dispersed is added thereto; a slow addition rate is needed to avoid agglomeration c) Agitation is maintained for about 10 minutes after the addition of the mineral solid.

d) Finally, viscosity is measured immediately, and then after 1 hour, 24 hours and 48 hours using conventional viscosimeters, such as Bookfield, Ford cup etc.

General Method (B) to Prepare Dispersions of Ground Natural Calcium Carbonate and Measurement of Viscosity Thereof a) Water, dispersing agent and natural calcium which is to be ground are introduced in a vessel containing the grinding agent (balls).

b) The solution is then shaken or agitated until the desired particle size is obtained.

c) The viscosity of the solution is then measured immediately and then after 1 hour, 24 hours and 48 hours. Viscosity may be measured using conventional viscosimeters, such as Bookfield, Ford cup etc.

The dispersing agents used in the above tests are described in Table 1 below:

TABLE 1

Dispersing Agent Compositions

| Dispersing Agent | Composition |
| --- | --- |
| 1 (comp) (DISPEX DP6) | 100AA (IPA)-Mw 5010-% solids 43.5-pH 7.5 |
| 2 (comp) | 100AA (NaHP)-Mw 3500-% solids 42.5-pH 8.0 |
| 3 (comp) | 95AA/5HEA-Mw 4560-% solids 42.4-pH 8.1 |
| 4 (comp) | 95AA/5HPA-Mw 4570-% solids 41.8-pH 7.4 |
| 5 (comp) | 95AA/5EA-Mw 4520-% solids 42.6-pH 7.5 |
| 6 (comp) | 100AA (NaHP)-Mw 4830-% solids 47.7-pH 7.0 |
| 7 (comp) | 100AA (SMBS)-Mw 2000-% solids 43.0-pH 7.2 |
| 8 (comp) | 100AA (SMBS)-Mw 4500-% solids 45.0-pH 7.0 |
| 9 (comp) | 100AA (NaHP)-Mw 3500-% solids 42.5-pH 5.5 |
| 10 (comp) (DISPEX N40) | 100AA (IPA)-Mw 3410-% solids 40.0-pH 7.5 |
| 11 (comp) (DISPEX 2695) | 100AA (IPA)-Mw 4500-% solids 42.4-pH 7.0 |
| 12 (comp) | Preferred phosphonated oligonmaleate of EP-A-705892, prepared according to Example 1 of EP-A-0569731 |
| A (exp) | 100AA ($H_3PO_3$)-Mw 5110-% solids 45.8-pH 6.6 |
| B (exp) | 100AA ($H_3PO_3$)-Mw 4880-% solids 48.7-pH 7.1 |
| C (exp) | 100AA ($H_3PO_3$)-Mw 3600-% solids 40.0-pH 7.0 |
| D (exp) | 90AA/10MALAC ($H_3PO_3$) Mw 2000-% solids 50.0-pH 7.5 |
| E (exp) | 100AA ($H_3PO_3$)-Mw 2000-% solids 50.0-pH 7.5 |
| F (exp) | 100AA ($H_3PO_3$)-Mw 5170-% solids 42.0-pH 5.5 |
| G (exp) | 100AA ($H_3PO_3$)-Mw 5170-% solids 42.0-pH 7.0 |
| H (exp) | 100AA ($H_3PO_3$)-Mw 5800-% solids 42.0-pH 5.5 |
| I (exp) | 100AA ($H_3PO_3$)-Mw 5800-% solids 42.0-pH 7.0 |

Key

DISPEX N40, DISPEX DP 6 and DISPEX 2695 are commercial dispersing agents available from Allied Colloids Limited. DISPEX is a trade mark owned by Allied Colloids Limited.

AA=acrylic acid
MALAC=maleic acid
AMPS=2-acrylamido 2-methyl propane sulphonic acid
EA=ethyl acrylate
HEA=hydroxy ethyl acrylate
HPA=hydroxy propyl acrylate Dispersing agents 1, 10 and 11 were prepared using a method well known to those skilled in the art using isopropyl alcohol (IPA) as the chain transfer agent. Dispersing agents 2, 6, and 9 were prepared using sodium hypophosphite (NaHP) as the chain transfer agent. Dispersing agents 7, and 8 were prepared using sodium metabisulphite (SMBS) and dispersing agents A–I are phosphonate containing polymers of the present invention and were all prepared using phosphorous acid ($H_3PO_3$) as the chain transfer agent.

EXAMPLE 1

Measurement of Viscosity and Gel Tendency for Dispersions of Precipitated Calcium Carbonate of Particle Size 70%<2 Microns Aqueous dispersions of precipitated calcium carbonate with particle size 70%<2 microns were prepared using General Method (A) described above. The Viscosity and gel tendency results are given in Table 2 below.

TABLE 2

Viscosity and Gel Tendency Results for Dispersions of Precipitated Calcium Carbonate of Particle Size 70% < 2 Microns

| Disp. Agent | dose (%) | Solids (%) | Brookfield Viscosity (rpm) | | | Gel Tendency | | |
|---|---|---|---|---|---|---|---|---|
| | | | 10 | 50 | 100 | 1 hr | 24 hr | 48 hr |
| 1 | 0.80 | 75.0 | 2700 | 876 | 582 | 1.0 | 7.1 | — |
| 2 | 0.80 | 75.0 | 2860 | 916 | 604 | 1.3 | 7.1 | 9.1 |
| C | 0.80 | 75.0 | 1860 | 652 | 444 | 0.7 | 4.1 | 5.5 |
| D | 0.80 | 75.0 | 1540 | 556 | 390 | 0.5 | 2.1 | 4.2 |
| G | 0.80 | 75.0 | 1120 | 456 | 344 | 0.3 | 7.9 | 11.8 |

The above results demonstrate that the dispersing agents used in the present invention, i.e. C, D and G, provide dispersions with significantly lower viscosity than dispersing agents 1 and 2. Also, with dispersing agents C and D, in particular, the gel tendency is much lower than that obtained for similar dispersions using non-phosphonate containing polymers as the dispersing agent.

EXAMPLE 2

Measurement of the Viscosity and Gel Tendency for Ground Natural Calcium Carbonate of Particle Size 79–83%<1 Micron Aqueous dispersions of ground natural calcium carbonate with particle size 79–83%<1 micron were prepared using General Method (B) described above. The Viscosity and gel tendency results are given in Table 3 below.

TABLE 3

Viscosity and Gel Tendency Results for Ground Natural Calcium Carbonate of Particle Size 79–83% < 1 Micron

| Disp. Agent | dose (%) | Solids (%) & % < 1 μm | % < 1 μm | Brookfield Viscosity (rpm) | | | Gel Tendency | | |
|---|---|---|---|---|---|---|---|---|---|
| | | | | 10 | 50 | 100 | 2 hr | 24 hr | 48 hr |
| 1 | 2.35 | 78.5 | 75.7 | 440 | 184 | 136 | 0.5 | 2 | 3 |
| A | 2.4 | 78.6 | 75.4 | 520 | 224 | 168 | 1 | 2 | 3 |
| 3 | 2.37 | 78.0 | 74.7 | 1360 | 624 | 456 | 8 | 30 | 34 |
| 4 | 2.38 | 77.6 | 74.8 | 720 | 352 | 268 | 4 | 23 | 28 |
| 5 | 2.45 | 78.0 | | Slurry too viscous | | | | | |
| 6 | 2.42 | 78.5 | 75.4 | 1200 | / | 380 | 1.5 | 8 | 12.5 |

As the above results show, dispersing agent A which contains phosphonate groups and is according to the present invention, provides favourable viscosity and gel tendency as compared to the comparative dispersing agents 3, 4, 5 and 6.

EXAMPLE 3

Measurement of the Viscosity and Gel Tendency For Dispersions Of Precipitated Calcium Carbonate of Particle Size 95%<1 Microns Aqueous dispersions of precipitated calcium carbonate with particle size 95%<1 micron were prepared using General Method (A) described above. The Viscosity and gel tendency results are given in Table 4 below.

TABLE 4

Measurement of the Viscosity and Gel Tendency Results
Obtained For Dispersions of Precipitated Calcium Carbonate of Particle
Size 95% < 1 Microns

| Disp. Agent | dose (%) | pH | Solids (%) | Brookfield Viscosity (rpm) | | | Gel Tendency | | |
|---|---|---|---|---|---|---|---|---|---|
| | | | | 10 | 50 | 100 | 1 hr | 24 hr | 48 hr |
| 1 | 0.8 | 12.3 | 75.0 | 2900 | 920 | 582 | 1.9 | 10.9 | 15.2 |
| 2 | 0.8 | 12.4 | 75.0 | 7740 | 2012 | 1158 | 5.3 | 13.9 | 15.7 |
| 7 | 0.8 | 11.7 | 75.0 | 17360 | NM | NM | 10.7 | 18.2 | 21.7 |
| 8 | 0.8 | 12.2 | 75.0 | 6740 | 1840 | 1072 | 4.6 | 19.7 | 20.9 |
| 9 | 0.8 | 11.7 | 75.0 | 5340 | 1448 | 850 | 3.4 | 13.1 | 13.9 |
| 10 | 0.8 | 12.3 | 75.0 | 3060 | 944 | 586 | 2.3 | 12.5 | 14.6 |
| 11 | 0.8 | 11.6 | 75.0 | 3120 | 964 | 602 | 1.8 | 11.5 | 13.1 |
| C | 0.8 | 11.2 | 75.0 | 3360 | 1000 | 614 | 2.6 | 9.1 | 10.3 |
| D | 0.8 | 12.7 | 75.0 | 2840 | 852 | 526 | 2 | 7.3 | 8.7 |
| E | 0.8 | 10.8 | 75.0 | 7160 | 1888 | 1086 | 4.8 | 8.6 | 8.5 |
| B | 0.8 | 12 | 75.0 | 1980 | 764 | 512 | 1.2 | 17 | 17.9 |
| F | 0.8 | 10.9 | 75.0 | 1280 | 550 | 394 | 0.9 | 15.1 | 19.3 |
| G | 0.8 | 12.9 | 75.0 | 840 | 448 | 344 | 0.3 | 17.9 | 21 |
| H | 0.8 | 12.4 | 75.0 | 1600 | 668 | 466 | 0.4 | 21.1 | 27.7 |
| I | 0.8 | 12.9 | 75.0 | 1360 | 604 | 430 | 0.2 | 20.5 | 23.4 |

From the results in Table 4, it is to be noted that phosphonopolycarboxylic acids provide a significant improvement in the viscosity and gel tendency of dispersed of calcium carbonate with 95% of the particles being less than 1 micron in size.

EXAMPLE 4

Comparison of the Viscosity of Dispersing Agent C Against the Viscosity of Dispersing Agent 12 (the preferred phosphonated oligonmaleate of EP-A-705892 which was prepared according to Example 1 of EP-A-0569731)

75% Aqueous dispersions of precipitated calcium carbonate with particle size 90%<1 micron were prepared using General Method (A) described above. 0.8% dispersing agents were used. The viscosity was measured using a Brookfield viscosimeter RV model (spindle 4) at 10, 20, 50 and 100 rpm. The results are given in Table 5 below.

TABLE 5

Viscosity for Dispersing Agent C Against Dispersing Agent 12

| | Dispersing Agent C (exp.) | | Dispersing Agent 12 (comp.) | |
|---|---|---|---|---|
| Spindle Speed | Viscosity (mPa.s) | Torque % | Viscosity (mPa.s) | Torque % |
| 10 rpm | 7260 | 36.3 | Not measureable, too viscous | |
| 20 rpm | 4030 | 40.3 | Not measureable, too viscous | |
| 50 rpm | 1884 | 47.1 | Not measureable, too viscous | |
| 100 rpm | 1078 | 53.9 | Not measureable, too viscous | |

EXAMPLE 5

Comparison of the % Torque of Dispersing Agent C Against the % Torque of Dispersing Agent 12 (the preferred phosphonated oliaonmaleate of EP-A-705892 which was prepared according to Example 1 of EP-A-0569731)

75% Aqueous dispersions of precipitated calcium carbonate with particle size 90%<1 micron were prepared using General Method (A) described above. 0.8% dispersing polymers were used. This time the % Torque was measured at time=zero, and after 1, 2 and 7 days using a Brookfield viscosimeter RV III model and a helipath spindle (1 rpm/25s—spindle C). The results are given in Table 6 below. Torque is related to the gelation behaviour of calcium carbonate slurries.

TABLE 6

A Comparison of the Gel Tendency Results Obtained For Dispersing Agent C Compared Against Dispersing Agent 12.

| | Dispersing Agent C (exp.) | | Dispersing Agent 12 (comp.) | |
|---|---|---|---|---|
| Time (days) | Viscosity (mPa.s) | Torque % | Viscosity (mPa.s) | Torque % |
| 0 | 57000 | 5.7 | 735000 | 73.5 |
| 1 | 134000 | 13.4 | 730000 | 73.0 |
| 2 | 142000 | 14.2 | 742000 | 74.2 |
| 10 | 187000 | 18.7 | 813000 | 81.3 |

As the results in Tables 5 and 6 above demonstrate, the phosphonated dispersing agents of the present invention provide significantly improved performance over the dispersing agents of prior art document EP-A-0705892, providing stable dispersions with a lower viscosity, even after standing for several days.

We claim:

1. Dispersion of particulate calcium carbonate solids in a medium containing water and at least one dispersing agent, wherein the dispersing agent comprises a water soluble, phosphonate terminated homopolymer of acrylic acid with a weight average weight of from 2000 to 5800 and wherein 70% or more of the particulate calcium carbonate has a particle size of less than 2 μm.

2. Dispersion of particulate calcium carbonate solids in a medium containing water and at least one dispersing agent, wherein the dispersing agent is a water soluble, phosphonate terminated copolymer of acrylic acid and maleic anhydride with a weight average molecular weight of from 2000 to 5800.

3. Dispersion of particulate calcium carbonate solids in a medium containing water and at least one dispersing agent, wherein the dispersing agent is selected from the group consisting of water soluble, phosphonate terminated, homopolymers of methacrylic acid and copolymers of methacrylic acid and maleic anhydride, both dispersing agents having a weight average molecular weight of from 1000 to 10,000.

4. Method of reducing the viscosity of a dispersion of particulate calcium carbonate solids in an aqueous medium comprising contacting the aqueous medium, either before or after forming the dispersion of the solid particulate material, with an effective amount of at least one dispersing agent, wherein said dispersing agent comprises a water soluble, phosphonate terminated homopolymer of acrylic acid with a weight average weight of 2000 to 5800 and wherein 70% or more of the particulate calcium carbonate has a particle size of less than 2 $\mu$m.

5. Method of reducing the viscosity of a dispersion of particulate calcium carbonate solids in an aqueous medium comprising contacting the aqueous medium, either before or after forming the dispersion of the solid particulate material, with an effective amount of at least one dispersing agent, wherein the dispersing agent is selected from the group consisting of water soluble, phosphonate terminated. copolymers of acrylic acid and maleic anhydride, a homopolymer of methacrylic acid, and copolymers of methacrylic acid and maleic anhydride, all dispersing agents having a weight average weight of 1000 to 10,000, and wherein 70% or more of the particulate calcium carbonate has a particle size of less than 2 $\mu$m.

* * * * *